US012173150B2

(12) United States Patent
Meyer et al.

(10) Patent No.: US 12,173,150 B2
(45) Date of Patent: Dec. 24, 2024

(54) POLYESTER CARBONATES FROM CYCLOALIPHATIC DIACIDS AND ALIPHATIC DIOLS, AND PROCESS FOR PREPARING SAME

(71) Applicant: COVESTRO INTELLECTUAL PROPERTY GMBH & CO. KG, Leverkusen (DE)

(72) Inventors: Alexander Meyer, Düsseldorf (DE); Thomas Pfingst, Tönisvorst (DE); Helmut Werner Heuer, Siegen (DE); Jan Heijl, Lokeren (BE); Annabelle Bertin, Antwerp (BE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 763 days.

(21) Appl. No.: 17/415,958

(22) PCT Filed: Dec. 12, 2019

(86) PCT No.: PCT/EP2019/084847
§ 371 (c)(1),
(2) Date: Jun. 18, 2021

(87) PCT Pub. No.: WO2020/126806
PCT Pub. Date: Jun. 25, 2020

(65) Prior Publication Data
US 2022/0073737 A1    Mar. 10, 2022

(30) Foreign Application Priority Data

Dec. 20, 2018 (EP) ..................... 18214786

(51) Int. Cl.
C08G 63/64      (2006.01)
C08G 63/199     (2006.01)
C08G 63/82      (2006.01)
C08G 64/02      (2006.01)
C08G 64/30      (2006.01)
C08L 69/00      (2006.01)

(52) U.S. Cl.
CPC .......... *C08L 69/005* (2013.01); *C08G 63/199* (2013.01); *C08G 63/64* (2013.01); *C08G 63/82* (2013.01); *C08G 64/0208* (2013.01); *C08G 64/305* (2013.01)

(58) Field of Classification Search
USPC .................................. 528/196, 198
See application file for complete search history.

(56) References Cited

U.S. PATENT DOCUMENTS

| | | | |
|---|---|---|---|
| 3,972,852 | A | 8/1976 | Inata et al. |
| 5,986,040 | A | 11/1999 | Patel et al. |
| 2009/0105393 | A1 | 4/2009 | Jansen et al. |

FOREIGN PATENT DOCUMENTS

| | | |
|---|---|---|
| DE | 2438053 A1 | 2/1975 |
| EP | 3026074 A1 | 6/2016 |
| EP | 3248999 A1 | 11/2017 |
| EP | 3611156 A1 | 2/2020 |
| JP | 04-345616 A | 12/1992 |
| JP | 2010-077398 A | 4/2010 |
| JP | 2014214251 A | 11/2014 |
| WO | 01/32742 A1 | 5/2001 |
| WO | 2015/028200 A1 | 3/2015 |

OTHER PUBLICATIONS

International Preliminary Report on Patentability received for PCT Patent Application No. PCT/EP2019/084847, mailed on Jul. 1, 2021, 12 pages (6 pages of English Translation and 6 pages of Original Document).

International Search Report and Written Opinion received for PCT Patent Application No. PCT/EP2019/084847, mailed on Feb. 10, 2020, 14 pages (6 pages of English Translation and 8 pages of Original Document).

*Primary Examiner* — Terressa Boykin

(74) *Attorney, Agent, or Firm* — The Webb Law Firm

(57) ABSTRACT

The present invention relates to a method for preparing a polyester carbonate starting from cycloaliphatic diacids and aliphatic diols and to the polyester carbonate prepared by the method. The method according to the invention is a direct synthesis in which all the structural elements that form the subsequent polyester carbonate are already present as monomers in the first step of the method.

14 Claims, No Drawings

POLYESTER CARBONATES FROM CYCLOALIPHATIC DIACIDS AND ALIPHATIC DIOLS, AND PROCESS FOR PREPARING SAME

CROSS-REFERENCE TO RELATED APPLICATIONS

This application is a national stage application (under 35 U.S.C. § 371) of PCT/EP2019/084847, filed Dec. 12, 2019, which claims benefit of European Application No. 18214786.8, filed Dec. 20, 2018, both of which are incorporated herein by reference in their entirety.

The present invention relates to a method for preparing a polyester carbonate starting from cycloaliphatic diacids and aliphatic diols and to the polyester carbonate prepared by the method.

Polyesters, polycarbonates and polyester carbonates are known to have good mechanical properties and good stability to heat distortion and to weathering. Depending on the monomers used, each polymer group has certain key features that characterize materials of this type. For instance, polycarbonates in particular have good mechanical properties, whereas polyesters often exhibit better chemical stability. Polyester carbonates, depending on the chosen monomers, exhibit property profiles from both of said groups.

Although aromatic polycarbonates or polyesters often do have a good property profile, they exhibit shortcomings in their stability to ageing and to weathering. For example, absorption of UV light leads to yellowing and sometimes embrittlement of these thermoplastic materials. Aliphatic polycarbonates and polyester carbonates have better properties in this respect, in particular better stability to ageing and/or to weathering and better optical properties (for example transmission). A further advantage of aliphatic polymers is that the raw materials are more easily obtainable from biological sources. Aliphatic monomers such as sugar derivatives or isosorbide are nowadays obtainable from bio-based raw materials, whereas aromatic monomers are by contrast available from bio-based raw materials only to a limited extent, if at all. In the context of the present invention, the expression "bio-based" is understood as meaning that the relevant chemical compound is at the filing date available and/or obtainable via a renewable and/or sustainable raw material, and/or preferably is such a renewable and/or sustainable raw material. The expression serves in particular as a means of differentiating from raw materials from fossil sources. Whether a raw material is bio-based or is based on fossil sources can be determined by measurement of carbon isotopes in the raw material, as the relative amounts of the carbon isotope C14 are lower in fossil raw materials. This can be done, for example, in accordance with ASTM D6866-18 (2018) or ISO16620-1 to -5 (2015).

The drawback with aliphatic polycarbonates or polyester carbonates is often the low glass transition temperature thereof. Accordingly, it is advantageous to use cycloaliphatic alcohols as (co)monomers. These have a beneficial effect on inter alia the mechanical properties. To raise the glass transition temperature further, cycloaliphatic acids such as cyclohexane-1,2-, -1,3- or -1,4-dicarboxylic acids or corresponding naphthalene derivatives can also be used as (co)monomers. Depending on the choice of the reactants, polyesters or polyester carbonates are then obtained. This application relates to the direct conversion of the raw materials, i.e. isosorbide and cycloaliphatic diacids by way of example, into the corresponding polyester carbonates. The polyesters of cyclohexanedicarboxylic acid and isosorbide are described by Oh et al. in Macromolecules 2013, 46, 2930-2940, whereas the present invention is by preference directed to polyester carbonates.

Large-scale industrial preparation of polyester carbonates from the free acids is generally possible only to a limited degree; these are often prepared by transesterification of corresponding ester-containing monomers with diols. For example, the polyester from cyclohexane-1,4-dimethanol and cyclohexane-1,4-dicarboxylic acid is prepared starting from the dimethyl ester of the diacid (EP3248999 A1, U.S. Pat. No. 5,986,040 A or Jaykannan et al. in J. Polym Sci, Part A, Polym Chem. 2004, vol. 42, 3996). However, it was found, in accordance with the invention, that cycloaliphatic diacids esterified with aliphatic alcohols surprisingly show only low reactivity in the transesterification reaction to polyester carbonates, which means that the molecular weights of the corresponding polyester carbonates after the transesterification reaction are rather low (see example 6). Such polymers accordingly exhibit only unsatisfactory properties.

EP3026074 A1 describes the reaction starting from diphenyl esters of the corresponding cycloaliphatic acids. However, the preparation of the diester needed for this is complex. The methods described in EP 3026074 A1 and in EP 3248999 A1 for preparing diphenyl esters and the resulting polymers are suboptimal, since either the yields of the precursors are low (example 1; EP3026074 A1) or the use of toxic substances such as phosgene (example 1 and example 2 in EP3248999 A1) is necessary. The use of solvents is also necessary, which necessitates costly processing steps. The described methods are therefore relatively complex methods that in particular require additional purification steps.

US 2009/105393 A1 discloses an isosorbide-based polycarbonate polymer consisting of an isosorbide unit, an aliphatic unit derived from an aliphatic C14 to C44 diacid, from an aliphatic C14 to C44 diol or from a combination thereof, and optionally an additional unit that is different from the isosorbide unit and from the aliphatic unit, with the isosorbide unit, the aliphatic unit and the additional unit each being carbonates or a combination of carbonate and ester units. The frequent disadvantages of aliphatic polycarbonates or polyester carbonates have already been discussed above.

Kricheldorf et al. (Macromol. Chem. Phys 2010, 211, 1206-1214) reports that a polyester based on cyclohexanedicarboxylic acid and isosorbide is not obtainable from cyclohexanedioic acid or from the cyclohexane dimethyl ester (or gives only very low molecular weights) and can be prepared only from the acid chloride of cyclohexanedicarboxylic acid.

The easy preparation of aromatic polyester carbonates is described, for example, in WO 01/32742 A1. This describes a direct synthesis or one-pot synthesis, i.e. a synthesis in which all the structural elements that form the subsequent polyester carbonate are already present as monomers at the start of the synthesis. Aromatic dihydroxy compounds such as bisphenol A, carboxylic acid diesters and aromatic or linear aliphatic diacids are used as monomers here. Because this document is limited to the preparation of aromatic polyester carbonates, it is possible for temperatures of 300° C. to be employed in the condensation reaction in which the phenol that is formed is removed. The use of such temperatures is not possible when preparing aliphatic polyester carbonates, since aliphatic diols tend to undergo elimination and/or thermal decomposition if subjected to such thermal stress. At the same time, the high temperature is however necessary in order to grow to the desired high molecular weights. What is particularly clear here is the different reactivity of aliphatic and aromatic diols. For example, it is known from the literature that isosorbide is rarely completely incorporated into a polymer, with up to 25% of the isosorbide instead being lost during the polymerization reaction, depending on the chosen reaction conditions. It is accordingly not readily possible to extrapolate the reaction conditions for aromatic diols to aliphatic diols. This is particularly evident from the fact that the reaction times of the polycondensation (corresponding to step (ii) of the method) in WO01/32742 A1 are appreciably longer at higher temperatures than those observed in accordance with the invention.

JP1992-345616 A and DE2438053 A1 likewise use aromatic structural units and correspondingly high temperatures. For the reasons mentioned above, extrapolation of the teachings therein to aliphatic structural units is not possible.

In the as yet unpublished patent application EP18189636.6, the reaction of diphenyl carbonate with cyclohexanedicarboxylic acid to cyclohexane diphenyl ester is described as resulting in a brown discoloration of the mixture, with distillative purification of the cyclohexane diphenyl ester necessary in order to obtain polyester carbonates with good optical properties. It was moreover observed that, without the distillation, the impurities causing the discoloration were incorporated into the polymer and consequently could not be removed by precipitation. This means that, without distillation, it is not possible to obtain a polyester carbonate that has good optical properties. On the basis of this observation, those skilled in the art would not consider a one-pot synthesis in the presence of all monomers, since purification of the cyclohexane diphenyl ester formed as an intermediate would be regarded as essential for the optical quality of the polymer.

Based on this prior art, the underlying object of the present invention was therefore to provide a method for preparing a polyester carbonate from cycloaliphatic diacids and aliphatic diols by melt transesterification, which is particularly straightforward. In this context, "straightforward" is to be understood in particular as meaning a method that requires only modest outlay on equipment, involves few steps, in particular purification steps, and/or is accordingly economically and also environmentally advantageous. The method should in particular be simpler than the described prior art methods for preparing polyester carbonates from cycloaliphatic diacids and aliphatic diols. In particular, the object underlying the present invention was to provide a method for preparing a polyester carbonate from cycloaliphatic diacids and aliphatic diols that preferably additionally provides a corresponding polyester carbonate having a sufficiently high molar mass. A "sufficiently high molar mass" is here preferably understood as meaning a polymer having a relative viscosity in solution of at least 1.12 (preferably measured in dichloromethane at a concentration of 5 g/l at 25° C. using an Ubbelohde viscometer) and/or a mass-average molar mass of at least 40 000 g/mol (preferably determined by gel-permeation chromatography in dichloromethane with polystyrene calibration).

At least one, preferably all of the abovementioned objects were achieved by the present invention. It was surprisingly found that the synthesis of a polyester carbonate from cycloaliphatic diacids and aliphatic diols by melt transesterification is possible in a direct synthesis or one-pot synthesis in which all the structural elements that form the subsequent polyester carbonate are already present as monomers at the start of the synthesis. However, it emerged that only specific molar ratios of the cycloaliphatic diacids and aliphatic diols resulted in a polymer with the appropriate molar mass and thus also the appropriate mechanical properties. Firstly, it was surprising that a direct synthesis, despite the described preconceptions of the prior art, also works for the reaction of a cycloaliphatic dicarboxylic acid, an aliphatic dihydroxy compound (also termed aliphatic diol in accordance with the invention) and a diaryl carbonate. A further, complete surprise was that the molar ratio of all aliphatic dihydroxy compounds to all cycloaliphatic dicarboxylic acids is essential in order to obtain corresponding polymers at all. This led to the discovery of a method that provides access to a polyester carbonate from cycloaliphatic diacids and aliphatic diols and is particularly straightforward, i.e. it requires only modest outlay on equipment, involves few steps, in particular purification steps, and is accordingly economically and also environmentally advantageous.

Moreover, a new polyester carbonate was obtained that has a different structure, i.e. a different statistical distribution of the structural elements than the previously described polyester carbonates of the prior art. The method for preparing a polyester carbonate according to the invention can be described schematically, for example by the reaction of cyclohexanedicarboxylic acid, isosorbide and diphenyl carbonate, as shown below:

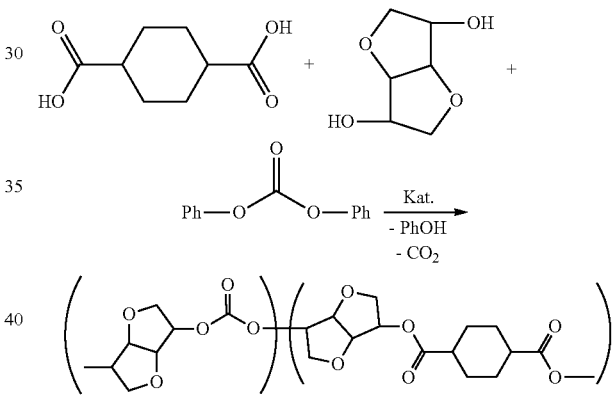

(the citing of these particular three starting substances is purely for the purposes of elucidating the invention and is not to be understood as limiting).

In the direct synthesis according to the invention, an evolution of gas was initially observed (evolution of carbon dioxide). If a sample is taken from the mixture once the evolution of gas has largely subsided, it can be demonstrated analytically that oligomers have already formed. These oligomers condense in a further step to form the polyester carbonate according to the invention. The examples according to the invention show that the statistical distribution of the carbonate blocks and of the ester blocks (see scheme above) in these oligomers is already different from a purely statistical distribution of the blocks when only a derivative of cyclohexanedicarboxylic acid reacts with diphenyl carbonate and isosorbide (by way of example) as in the prior art. Moreover, the reactivity of such oligomers is different from that of pure cyclohexane diphenyl esters, isosorbide and pure diphenyl carbonate. The net result of the method according to the invention is therefore to obtain a polymer in which the statistical distribution of the various blocks is different from that of a polymer obtained from a cyclohexane diphenyl ester, isosorbide and diphenyl carbonate.

Moreover, it was observed that the polyester carbonate according to the invention shows more terminal phenyl groups in the $^1$H NMR than the polyester carbonate described in EP3026074 A1 that was prepared via a two-step method. Even though a slight excess of isosorbide was used in the examples according to the invention, terminal phenyl groups still formed. These are advantageous, since terminal OH groups are hydrolytically unstable, particularly at the high processing temperatures of the polymer, can result in transesterification reactions and can also lower thermal stability.

The invention therefore provides a method for preparing a polyester carbonate by melt transesterification, comprising the steps of:
 (i) reaching at least one cycloaliphatic dicarboxylic acid with at least one diaryl carbonate using at least one catalyst and in the presence of at least one aliphatic dihydroxy compound and
 (ii) subjecting the mixture obtained from step (i) of the method to further condensation, at least with removal of the chemical compound eliminated in the condensation,
characterized in that the molar ratio of all aliphatic dihydroxy compounds present in step (i) of the method to all cycloaliphatic dicarboxylic acids present in step (i) of the method prior to reaction in step (i) of the method is 1:0.6 to 1:0.05.

According to the invention, step (i) of the method comprises at least the reaction of at least one cycloaliphatic dicarboxylic acid with at least one diaryl carbonate. However, the presence of the at least one aliphatic dihydroxy compound means that further reaction cannot according to the invention be ruled out. In fact, in the examples according to the invention it was demonstrated that in step (i) of the method oligomers already form that have a mass difference in the MALDI-ToF mass spectrometer corresponding to one unit from the aliphatic dihydroxy compound with carbonate (with loss of the two hydroxy groups). This means that, in step (i) of the method, further reaction can take place in addition to the formation of the diester. However, in accordance with the invention, this also means that the reaction of all the cycloaliphatic dicarboxylic acid present with the stoichiometric equivalent of diaryl carbonate does not need to have proceeded to completion before step (ii) of the method is initiated. According to the invention, it is however preferable for step (i) of the method to proceed until the evolution of gas is observed to have largely ceased, with step (ii) of the method initiated, for example by applying vacuum to remove the chemical compound eliminated in the condensation, only once this point is reached. However, as already stated above, it may not necessarily be possible in accordance with the invention to achieve a clear separation between steps (i) and (ii) of the method.

Step (i) of the Method

The method according to the invention is referred to as a direct synthesis or one-pot synthesis, since in step (i) of the method all the structural elements that form the subsequent polyester carbonate are already present as monomers. This preferably means that, according to the invention, all aliphatic dihydroxy compounds, all cycloaliphatic dicarboxylic acids and also all diaryl carbonates are present in this step, even if there is more than just one dihydroxy compound, one cycloaliphatic dicarboxylic acid and/or one diaryl carbonate. It is therefore preferable in accordance with the invention that all monomers that are to undergo condensation to the polyester carbonate in step (ii) of the method are already present during step (i) of the method. The invention likewise encompasses the embodiment in which a small proportion of the at least one diaryl carbonate is additionally added in step (ii) of the method. This may be selectively used to lower the terminal OH group content of the polyester carbonate that is formed. Such an approach is described, for example, in JP2010077398 A. However, in order that all the structural elements that form the subsequent polyester carbonate are already present as monomers in step (i) of the method and no further structural elements are added, it is necessary here that the at least one diaryl carbonate added in small amounts in step (ii) of the method is the same as the at least one diaryl carbonate present in step (i) of the method. The method can in this sense therefore still be referred to as a direct synthesis or one-pot synthesis.

In addition, the invention does not exclude the presence of aromatic dihydroxy compounds and/or aromatic dicarboxylic acids in step (i) of the method. However, these are preferably present only in small proportions. In step (i) of the method it is particularly preferable that an aromatic dihydroxy compound is additionally present in a content of up to 20 mol %, more preferably up to 10 mol % and most preferably up to 5 mol %, in each case based on the total molar amount of the dihydroxy compound used. In step (i) of the method it is likewise particularly preferable that an aromatic dicarboxylic acid is additionally present, optionally also in addition to the aromatic dihydroxy compound, in a content of up to 20 mol %, more preferably up to 10 mol % and most preferably up to 5 mol %, in each case based on the total molar amount of the dicarboxylic acid used. In these cases, it remains preferable in accordance with the invention to refer to the product as an aliphatic polyester carbonate. However, it is particularly preferable for no aromatic dihydroxy compound to be used in step (i) of the method. It is also preferable for no aromatic dicarboxylic acid to be used in step (i) of the method. Preference is likewise given to using neither an aromatic dihydroxy compound nor an aromatic dicarboxylic acid in step (i) of the method.

These additional aromatic dihydroxy compounds are preferably selected from the group consisting of bisphenol A, 1,1-bis(4-hydroxyphenyl)-3,3,5-trimethylcyclohexane, 4,4'-dihydroxybiphenyl (DOD), 4,4'-dihydroxybiphenyl ether (DOD ether), bisphenol B, bisphenol M and bisphenols (I) to (III)

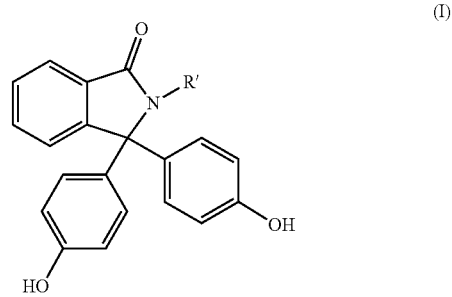

(I)

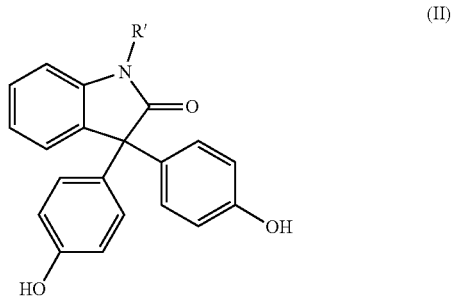

(II)

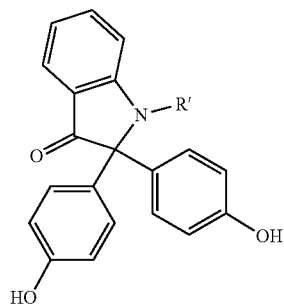

(III)

wherein, in these formulas (I) to (III), R' in each case represents C1-C4 alkyl, aralkyl or aryl, preferably methyl or phenyl, most preferably methyl.

These additional aromatic dicarboxylic acids are preferably selected from the group consisting of isophthalic acid, terephthalic acid, furandicarboxylic acid and naphthalene-2,6-dicarboxylic acid. It is known that small proportions of these aromatic diacids can reduce the absorption of water by an aliphatic polyester carbonate.

According to the invention, at least one aliphatic dihydroxy compound is used in step (i) of the method. This at least one aliphatic dihydroxy compound is preferably selected from the group consisting of cyclohexane-1,2-diol, cyclohexane-1,3-diol, cyclohexane-1,4-diol, cyclohexane-1,2-dimethanol, cyclohexane-1,3-dimethanol, cyclohexane-1,4-dimethanol, tricyclodecanedimethanol, 3,9-bis(1,1-dimethyl-2-hydroxyethyl)-2,4,8,10-tetraoxaspiro[5.5]undecane, 2,2-bis(4-hydroxycyclohexyl)propane, tetrahydro-2,5-furandimethanol and 1,4:3,6-dianhydrohexitols such as isomannide, isoidide and isosorbide. Any desired mixtures may also be used. The at least one aliphatic dihydroxy compound is most preferably isosorbide.

According to the invention, at least one cycloaliphatic dicarboxylic acid is likewise used in step (i) of the method. The at least one cycloaliphatic dicarboxylic acid is preferably selected from a compound of the chemical formula (IIa), (IIb) or mixtures thereof

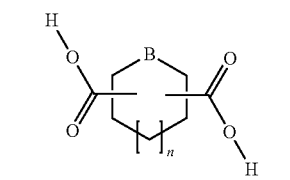

(IIa)

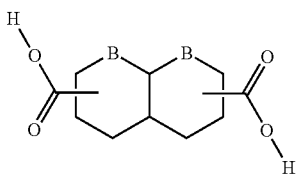

(IIb)

in which
B in each case independently represents a carbon atom or a heteroatom selected from the group consisting of O, S and N and n is a number between 0 and 3. It is further preferable that B represents a carbon atom or O and n is a number between 0 and 3, preferably 0 or 1.

In particular, it is preferable that the at least one cycloaliphatic dicarboxylic acid is selected from the group consisting of cyclohexane-1,4-dicarboxylic acid, cyclohexane-1,3-dicarboxylic acid, cyclohexane-1,2-dicarboxylic acid, tetradihydro-2,5-furandicarboxylic acid, tetradihydro-2,5-dimethylfurandicarboxylic acid, decahydronaphthalene-2,4-dicarboxylic acid, decahydronaphthalene-2,5-dicarboxylic acid, decahydronaphthalene-2,6-dicarboxylic acid and decahydronaphthalene-2,7-dicarboxylic acid. Any desired mixtures may also be used. Most preference is given to cyclohexane-1,4-dicarboxylic acid, cyclohexane-1,3-dicarboxylic acid or cyclohexane-1,2-dicarboxylic acid.

According to the invention, at least one diaryl carbonate is likewise used in step (i) of the method. The at least one diaryl carbonate is preferably selected from the group consisting of a compound of the formula (2)

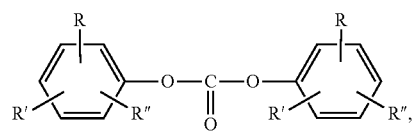

(2)

in which
R, R' and R" may each independently be identical or different and represent hydrogen, optionally branched C1-C34 alkyl, C7-C34 alkylaryl, C6-C34 aryl, a nitro group, a carbonyl-containing group, a carboxyl-containing group or a halogen moiety. The at least one diaryl carbonate is preferably diphenyl carbonate, 4-tert-butylphenyl phenyl carbonate, di(4-tert-butylphenyl) carbonate, biphenyl-4-yl phenyl carbonate, di(biphenyl-4-yl) carbonate, 4-(1-methyl-1-phenylethyl)phenyl phenyl carbonate, di[4-(1-methyl-1-phenylethyl)phenyl] carbonate, bis(methylsalicyl) carbonate, bis(ethylsalicyl) carbonate, bis(propylsalicyl) carbonate, bis(2-benzoylphenyl) carbonate, bis(phenylsalicyl) carbonate and/or bis(benzylsalicyl) carbonate. In particular, the at least one diaryl carbonate is preferably diphenyl carbonate, 4-tert-butylphenyl phenyl carbonate, di(4-tert-butylphenyl) carbonate, biphenyl-4-yl phenyl carbonate, di(biphenyl-4-yl) carbonate, 4-(1-methyl-1-phenylethyl)phenyl phenyl carbonate and/or di[4-(1-methyl-1-phenylethyl)phenyl] carbonate. The at least one diaryl carbonate is particularly preferably diphenyl carbonate.

In addition, at least one catalyst is according to the invention present in step (i) of the method. This is preferably an inorganic base and/or an organic catalyst. The at least one catalyst is particularly preferably an inorganic or organic base having a $pK_b$ of not more than 5.

It is also preferable that the at least one inorganic base or the at least one organic catalyst is selected from the group consisting of the hydroxides, carbonates, halides, phenoxides, diphenoxides, fluorides, acetates, phosphates, hydrogen phosphates and borates of lithium, sodium, potassium, caesium, calcium, barium and magnesium, tetramethylammonium hydroxide, tetramethylammonium acetate, tetraethylammonium fluoride, tetramethylammonium tetraphenylborate, tetraphenylphosphonium fluoride, tetraphenylphosphonium tetraphenylborate, dimethyldiphenylammonium hydroxide, tetraethylammonium hydroxide, cetyltrimethylammonium tetraphenylborate, cetyltrimethylammonium phenoxide, diazabicycloundecene (DBU), diazabicyclononene (DBN), 1,5,7-triazabicyclo[4.4.0]dec-5- ene, 7-phenyl-1,5,7-triazabicyclo[4.4.0]dec-5-ene, 7-methyl-1,5,7-triazabicyclo[4.4.0]dec-5-ene, 7,7'-hexylidenedi-1,5,7-triazabicyclo[4.4.0]dec-5-ene, 7,7'-decylidenedi-1,5,7-triazabicyclo[4.4.0]dec-5-ene, 7,7'-dodecylidenedi-1,5,7-triazabicyclo[4.4.0]dec-5-ene, the phosphazene base P1-t-oct (tert-octyliminotris(dimethylamino)phosphorane), the phosphazene base P1-t-butyl (tert-butyl-iminotris(dimethylamino)phosphorane) and 2-tert-butylimino-2-diethylamino-1,3-dimethyl perhydro-1,3,2-diaza-2-phosphorane (BEMP). Any desired mixtures may also be used.

The at least one catalyst is very preferably an organic base, preferably those mentioned above, especially preferably alkylamines, imidazole (derivatives), guanidine bases such as triazabicyclodecene, DMAP and corresponding derivatives, DBN and DBU, most preferably DMAP. These catalysts have the particular advantage that, in step (ii) of the method according to the invention, they can be removed with the chemical compound eliminated in the condensation, for example under reduced pressure. This means that the resulting polyester carbonate contains minimal residual catalyst or none at all. This has the particular advantage that no inorganic salts are present in the polymer, as are always formed, for example, in any route in which phosgene is used. It is known that such salts can have an adverse effect on the stability of the polyester carbonate, since the ions can act catalytically with corresponding degradation.

Preference is given to using the at least one catalyst in amounts from 1 to 5000 ppm, preferably 5 to 1000 ppm and more preferably 20 to 200 ppm, based on 1 mol of the cycloaliphatic dicarboxylic acid.

In accordance with the invention, it was found that the molar ratio of all aliphatic dihydroxy compounds present in step (i) of the method to all cycloaliphatic dicarboxylic acids present in step (i) of the method prior to the reaction in step (i) of the method needs to be 1:0.6 to 1:0.05 in order to obtain a polyester carbonate of sufficient molar mass. Preferably, this ratio is 1:0.55 to 1:0.1, likewise preferably 1:0.5 to 1:0.15 and most preferably 1:0.4 to 1:0.2. It must be noted here that the ratio of aliphatic dihydroxy compounds and cycloaliphatic dicarboxylic acids in the subsequent polyester carbonate should not be too high (i.e. the incorporation of cycloaliphatic dicarboxylic acids should not be too low), since otherwise a polymer with undesirable properties will be obtained. Polymers having a high content of units derived from dihydroxy compounds such as isosorbide are usually very rigid and consequently have inadequate mechanical properties. If the content of units derived from cycloaliphatic dicarboxylic acids is too low, the processability of the resulting polymers will likewise be poorer. In addition, polyester units generally give the polyester carbonate better chemical stability, which is why the content of units derived from cycloaliphatic dicarboxylic acids should likewise not be too low.

It is preferable in accordance with the invention that the polyester carbonate prepared has a relative solution viscosity eta rel of 1.12 to 1.60, more preferably 1.18 to 1.50, most preferably 1.20 to 1.40. It is preferable here that the relative solution viscosity is measured in dichloromethane at a concentration of 5 g/l at 25° C. using an Ubbelohde viscometer.

It is likewise preferable that the polyester carbonate prepared has a mass-average molar mass of 40 000 g/mol to 150 000 g/mol, more preferably 45 000 g/mol to 90 000 g/mol. This is preferably determined by gel-permeation chromatography in dichloromethane with polystyrene calibration. This mass average is most preferably determined by the gel-permeation chromatography method described in the examples section.

In accordance with the invention, these molar masses are preferably referred to as "sufficient" molar mass.

In addition, step (i) of the method according to the invention preferably comprises at least one, more preferably all of the following steps (ia) to (ic):

(ia) Melting all components present in step (i) of the method, i.e. at least the at least one cycloaliphatic dicarboxylic acid, the at least one diaryl carbonate and the at least one aliphatic dihydroxy compound in the presence of the at least one catalyst. This is preferably done under an inert gas atmosphere, preferably under nitrogen and/or argon. Step (ia) is preferably carried out in the absence of a solvent. The term "solvent" is in this context known to those skilled in the art. In accordance with the invention, the term "solvent" is preferably understood as meaning a compound that does not undergo chemical reaction in either of steps (i) and (ii) of the method. Exceptions are those compounds that are formed by the reaction (for example phenol, if diphenyl carbonate is used as the at least one diaryl carbonate). It is of course not possible to rule out the presence of traces of solvents in the starting compounds. This eventuality is preferably to be covered by the invention. However, it is preferable in accordance with the invention that an active step of adding such a solvent is avoided.

(ib) Heating the mixture, preferably the melt obtained from step (ia). Step (ia) and step (ib) may also overlap, since heating may likewise be necessary to produce a melt in step (ia). Heating is preferably initially to a temperature of 150° C. to 180° C.

(ic) Reacting the mixture, preferably the mixture obtained from step (ib), with introduction of mixing energy, preferably by stirring. Here too, step (ic) may overlap with step (ib), since the heating may already initiate the reaction of the mixture. The melt is here preferably already heated under standard pressure to temperatures between 150 and 180° C. by step (ib). The temperature in step (ic) is increased to 210° C.-300° C., preferably 220-260° C., in stages, depending on the observed reactivity.

The reactivity can be estimated from the gas evolved in a manner known to those skilled in the art. Although higher temperatures are in principle also possible in this step, side reactions (e.g. discoloration) can occur at higher temperatures. Higher temperatures are therefore less preferable. The mixture is stirred under standard pressure until the evolution of gas has largely ceased. In accordance with the invention, it is possible that under these conditions the aryl alcohol resulting from the reaction of the at least one carboxylic acid with the at least one diaryl carbonate (for example phenol if using diphenyl carbonate) will already be partly removed.

It was also observed in accordance with the invention that the at least one dihydroxy compound had likewise already begun to react by this time. This was demonstrated by the detection of oligomers containing carbonate units from the reaction of the at least one dihydroxy compound with the at least one diaryl carbonate and/or ester units from the reaction of the at least one dihydroxy compound with the at least one dicarboxylic acid.

In accordance with the invention, it is therefore preferable that, prior to the performance of step (ii) of the method, the mixture obtained from step (i) of the method includes oligomers containing carbonate units from the reaction of the at least one dihydroxy compound with the at least one diaryl carbonate and/or ester units from the reaction of the at least one dihydroxy compound.

The reaction time in step (ic) depends on the amount of the feedstocks. Preferably, the reaction time in step (ic) is between 0.5 h to 24 h, preferably between 0.75 h and 5 h and more preferably between 1 h and 3 h. A reaction time that ensures that gas evolution has largely ceased should preferably be chosen (see reaction scheme above).

In accordance with the invention, it is preferable that the molar ratio of the sum of all aliphatic dihydroxy compounds present in step (i) of the method and all cycloaliphatic dicarboxylic acids present in step (i) of the method to all diaryl carbonates present in step (i) of the method prior to reaction in step (i) of the method is 1:0.4 to 1:1.6, preferably 1:0.5 to 1:1.5, further preferably 1:0.6 to 1:1.4, more preferably 1:0.7 to 1:1.3, particularly preferably 1:0.8 to 1:1.2 and most preferably 1:0.9 to 1:1.1. Those skilled in the art are able to select appropriate optimal ratios in line with the purity of the feedstocks.

Step (ii) of the Method

In step (ii) of the method, the mixture obtained from step (i) of the method undergoes further condensation, at least with removal of the chemical compound eliminated during the condensation. In the context of the invention, the expression "further" condensation is to be understood as meaning that at least some condensation has already taken place in step (i) of the method. This is preferably the reaction of the at least one cycloaliphatic dicarboxylic acid with the at least one diaryl carbonate accompanied by elimination of an aryl alcohol. However, it is preferable that further condensation to oligomers has also already taken place (see step (i) of the method).

The term "condensation" is known to those skilled in the art. This is preferably understood as meaning a reaction in which two molecules (of the same substance or different substances) combine to form a larger molecule, with a molecule of a chemically simple substance being eliminated. This compound eliminated in the condensation is removed in step (ii) of the method. It is preferable that the chemical compound eliminated in the condensation is removed in step (ii) of the method by means of reduced pressure. It is accordingly preferable that the method according to the invention is characterized in that volatiles having a boiling point below the cycloaliphatic diester formed in step (i) of the method, below the at least one aliphatic dihydroxy compound and below the at least one diaryl carbonate are removed during the reaction in step (i) of the method, optionally with a stepwise reduction in pressure. If different volatiles are being removed, it is preferable to opt here for removal in stages. It is likewise preferable to opt for removal in stages to ensure that removal of volatiles is as complete as possible. The volatiles are the chemical compound(s) eliminated in the condensation.

Reducing the pressure in stages can be done, for example, by reducing the pressure as soon as the overhead temperature falls, so as to ensure continuous removal of the chemical compound eliminated in the condensation. Once a pressure of 1 mbar, preferably <1 mbar, is reached, the condensation is continued until the desired viscosity is reached. This can be done for example by monitoring the torque, i.e. the polycondensation is stopped on reaching the desired stirrer torque.

The removal of the condensation product in step (ii) of the method is effected preferably at temperatures of 210° C. to 280° C., more preferably 215° C. to 260° C. and particularly preferably 220° C. to 250° C. The pressure during the removal is further preferably 500 mbar to 0.01 mbar. It is particularly preferable that the removal is effected in stages by reducing the pressure. The pressure in the final stage is most preferably 10 mbar to 0.01 mbar.

In one embodiment, it is possible that at least one catalyst is added in step (ii) of the method. Such addition is still covered by the invention, since all structural elements that form the subsequent polyester carbonate are nevertheless present as monomers in step (i) of the method. This additional at least one catalyst may be identical or different to the catalyst present in step (i) of the method. The at least one catalyst is preferably selected from the catalysts mentioned in step (i) of the method. Such a procedure can be advantageous if the catalysts exhibit different reactivity in respect of the reactions primarily taking place in step (i) of the method and step (ii) of the method.

In a further aspect of the present invention, a polyester carbonate is provided that is obtained by the above-described inventive method in all disclosed combinations and preferences. As already explained above, the polyester carbonate according to the invention differs from a polyester carbonate prepared via a two-stage process (i.e. preparation first of a diaryl dicarboxylate through reaction of a cycloaliphatic dicarboxylic acid with a diaryl carbonate and purification of said diaryl dicarboxylate, followed by condensation of the diaryl dicarboxylate with a diaryl carbonate and an aliphatic dihydroxy compound) insofar as the carbonate units and/or ester units have different statistical distributions.

EXAMPLES

Materials Used:

Cyclohexanedicarboxylic acid: cyclohexane-1,4-dicarboxylic acid; CAS 1076-97-7, 99%; Sigma-Aldrich, Munich, Germany, abbreviated to CHDA Hydrogenated dimer acid CAS 68783-41-5≥98%, Sigma-Aldrich, Munich, Germany, as comparator substance Diphenyl carbonate: diphenyl carbonate, 99.5%, CAS 102-09-0; Acros Organics, Geel, Belgium, abbreviated to DPC 4-Dimethylaminopyridine: 4-(dimethylamino)pyridine; >98.0%; purum; CAS 1122-58-3; Sigma-Aldrich, Munich, Germany Isosorbide: isosorbide (CAS: 652-67-5), 99.8%, Polysorb PS A; Roquette Freres (62136 Lestrem, France); abbreviated to ISB Dimethyl cyclohexane-1,4-dicarboxylate: CAS 94-60-0 Sigma Aldrich (97%); cis/trans mixture Analytical Methods:

Determination of the glass transition temperature:

The glass transition temperature is determined by differential scanning calorimetry (DSC) in accordance with standard DIN EN ISO 11357-1:2009-10 and ISO 11357-2:2013-05 at a heating rate of 10 K/min under nitrogen with determination of the glass transition temperature (Tg) measured as the point of inflection in the second heating run.

Chemical Characterization:

$^1$H NMR: 600 MHz; Bruker AV III HD 600 spectrometer; solvent: $CDCl_3$

Solution Viscosity

Determination of solution viscosity: The relative solution viscosity ($\eta$rel; also referred to as eta rel) was determined in dichloromethane at a concentration of 5 g/l at 25° C. using an Ubbelohde viscometer.

Gel-Permeation Chromatography

Mass-average molar mass $\overline{M}_w$, number-average molar mass $\overline{M}_n$ and dispersity (D) values were determined by gel-permeation chromatography using dichloromethane as eluent, calibration with polystyrene standard, measured by Currenta GmbH & Co. OHG, Leverkusen. The eluent for the calibration is likewise dichloromethane. Column combination of crosslinked styrene-divinylbenzene resins. Diameter of analytical columns: 7.5 mm; length: 300 mm. Particle sizes of column material: 3 μm to 20 μm. Concentration of solutions: 1.0 g/l. Flow rate: 1.0 ml/min, temperature of solutions: 21° C. Detection using a refractive index (RI) detector.

MALDI-ToF-MS

The sample was dissolved in chloroform. The matrix used was Dithranol with LiCl. The sample was analysed in positive reflector and linear modes.

Example 1: Inventive; ISB:CHDA 1:0.5

A flask fitted with a short-path separator was charged with 17.22 g (0.10 mol) of cyclohexane-1,4-dicarboxylic acid, 29.815 g (0.204 mol) of isosorbide, 64.26 g (0.3 mol) of diphenyl carbonate and 0.01113 g (100 ppm), equivalent to 0.010% by weight, of DMAP (4-dimethylaminopyridine). The mixture was freed of oxygen by evacuating and releasing the vacuum with nitrogen four times. The mixture was melted and heated to 160° C. at standard pressure with stirring. The temperature was increased to 240° C. in stages, in line with the observed reactivity. Stirring was continued until $CO_2$ evolution ceased: this took approximately 1 hour (from melting at 160° C.). During this operation, phenol was distilled off.

On cessation of $CO_2$ evolution, the pressure was lowered cautiously to 100 mbar in stages over a period of approximately 20 minutes. During this operation, phenol was continuously distilled off. Evacuation was continued until a pressure of less than 1 mbar was reached. Stirring was continued at this pressure for approximately 30 minutes further, after which mixing was stopped.

Crude product 5.9 g of brown resin; NMR (1H NMR) confirmed that the desired compound had been obtained.

A light brown polymer with a solution viscosity of eta rel 1.335 was obtained.

Further data are given in table 1.

Example 2: Inventive; ISB:CHDA 1:0.4

The test was essentially carried out as described in example 1, except that 17.22 g (0.10 mol) of cyclohexane-1,4-dicarboxylic acid, 37.26 g (0.255 mol) of isosorbide and 74.97 g (0.35 mol) of diphenyl carbonate were used. The same amount of catalyst as in example 1 was used.

A light brown polymer with a solution viscosity of eta rel 1.288 was obtained.

Example 3: Inventive; ISB:CHDA 1:0.3

The test was essentially carried out as described in example 1, except that 17.22 g (0.10 mol) of cyclohexane-1,4-dicarboxylic acid, 49.25 g (0.337 mol) of isosorbide and 92.75 g (0.433 mol) of diphenyl carbonate were used. The same amount of catalyst as in example 1 was used.

A light brown polymer with a solution viscosity of eta rel 1.278 was obtained.

Example 4: Comparative Example 1: ISB:CHDA=1:1

The test was essentially carried out as described in example 1, except that 17.20 g (0.10 mol) of cyclohexane-1,4-dicarboxylic acid, 14.90 g (0.102 mol) of isosorbide and 42.80 g (0.20 mol) of diphenyl carbonate were used. The same amount of catalyst as in example 1 was used.

A brittle brown melt with a solution viscosity of eta rel 1.025 was obtained.

Example 5: Comparative Example 1: ISB:CHDA=0.8:1

The test was essentially carried out as described in example 1, except that 17.20 g (0.10 mol) of cyclohexane-1,4-dicarboxylic acid, 18.70 g (0.128 mol) of isosorbide and 48.20 g (0.225 mol) of diphenyl carbonate were used. The same amount of catalyst as in example 1 was used.

A brittle brown melt with a solution viscosity of eta rel 1.053 was obtained.

Example 6: Comparative Example, Using the Dimethyl Ester of CHDA Instead of CHDA The test was essentially carried out as described in example 1, except that 20.20 g (0.10 mol) of dimethyl cyclohexane-1,4-dicarboxylate, 37.26 g (0.255 mol) of isosorbide and 32.13 g (0.15 mol) of diphenyl carbonate were used. The same catalyst as in example 1 was used, but in an amount of 1000 ppm.

A brittle brown melt with a solution viscosity of eta rel 1.054 was obtained.

Example 7: Comparative Example Using Noninventive Acid

The test was essentially carried out as described in example 1, except that 27.70 g (0.05 mol) of hydrogenated dimer acid (CAS 68783-41-5), 24.64 g (0.169 mol) of isosorbide and 46.40 g (0.217 mol) of diphenyl carbonate were used. The same amount of catalyst as in example 1 was used.

A liquid product was obtained. Determination of the solution viscosity was omitted, as it was clear that inadequate polymer growth had taken place.

TABLE 1

| | Example 4 | Example 5 | Example 1 | Example 2 | Example 3 | Example 6 |
|---|---|---|---|---|---|---|
| ISB:CHDA ratios | approx. 1:1 | approx. 1:0.8 | approx. 1:0.5 | approx. 1:0.4 | approx. 1:0.3 | approx. 1:0.4 |

TABLE 1-continued

| | Example 4 | Example 5 | Example 1 | Example 2 | Example 3 | Example 6 |
|---|---|---|---|---|---|---|
| CHDA (mol) | 0.10 | 0.10 | 0.10 | 0.10 | 0.10 | 0.10 (as dimethyl ester) |
| DPC (mol) | 0.2 | 0.225 | 0.30 | 0.35 | 0.433 | 0.15 |
| ISB (mol) | 0.102 | 0.128 | 0.204 | 0.255 | 0.337 | 0.255 |
| Catalyst | 100 ppm DMAP | 100 ppm DMAP | 100 ppm DMAP | 100 ppm DMAP | 100 ppm DMAP | 1000 ppm DMAP |
| Eta rel | 1.025 (n.p.) | 1.053 (n.p.) | 1.391 (n.p.) | 1.29 (n.p.) | 1.28 (n.p.) | 1.054 (n.p.) |
| GPC | — | — | Mn = 23 360 g/mol Mw = 90 430 g/mol (n.p.) | Mn = 31 000 g/mol Mw = 61 000 g/mol (n.p.) | Mn = 27 400 g/mol Mw = 64 400 g/mol (n.p.) | |
| DSC | — | — | 151 (p.) | 154 (p.) | 156 (p.) | |

The abbreviation n.p. stands for "not precipitated"
The abbreviation p. stands for "precipitated"; the polymer was in each case precipitated in methanol.

Examples 1 to 3 show that the inventive method afforded the desired polyester carbonate in high viscosities provided the ratios of isosorbide to CHDA according to the invention had been conformed to.

This was surprising, given that transesterification reactions starting from free acids do not work well (see Jayakannan, J. Polym. Sci, Part A: Polymer Chemistry, 2004 vol. 42, 3996). Transesterification reactions starting from aliphatic esters (see comparative example 6) surprisingly show only very minimal growth in molecular weight, even though the ratios according to the invention had been conformed to.

Likewise, the comparison of example 7 with example 3 shows that the choice of acid component is important for adequate polymer growth. If an acid as described in US 2009/105393 A1 is used, only a liquid product is obtained.

Also surprising is that polymers having specific ISB:CHDA ratios cannot be synthesized. Thus, comparative examples 4 and 5 show that ratios with larger proportions of cyclohexanedicarboxylic acid do not afford the desired polymers and that the molecular weights obtained are very low. This was moreover not known/not inferable from the literature.

Example 8: Reaction in Step (i) of the Method

A flask fitted with a short-path separator was charged with 17.22 g (0.10 mol) of cyclohexane-1,4-dicarboxylic acid, 29.228 g (0.20 mol) of isosorbide, 42.84 g (0.2 mol) of diphenyl carbonate and 0.0089 g (100 ppm) of DMAP (4-dimethylaminopyridine). The mixture was freed of oxygen by evacuating and releasing the vacuum with nitrogen four times. The mixture was melted at 160° C., after which the temperature was raised to 190° C. Over a period of approx. 30 minutes, the temperature was raised to 240° C. The mixture was stirred at 240° C. for approx. 30 minutes. A slight vacuum was then applied for 20 minutes, with the pressure reduced in stages; after 20 minutes the pressure had decreased to 200 mbar and the reaction was stopped. The slight vacuum was for the purposes of removing phenol, since this otherwise interferes with the analysis.

To remove residual amounts of phenol and polar substances such as CHDA, the mixture was dissolved in dichloromethane and extracted with water three times. The product was analysed by MALDI-ToF-MS.

Peaks 172 Da apart were observed, which is clear evidence of the formation of ISB carbonate units (the mass corresponds to a Li adduct: M+Li*).

In addition, peaks at 555 Da were identified that could correspond to HO-ISB-carbonate-ISB-ester-CHDA-phenyl (where ISB denotes an isosorbide unit minus the two terminal OH groups (these are described separately); CHDA represents cyclohexane (cyclohexanedicarboxylic acid minus the two carboxylic acid groups)).

The peak observed at 607 Da could correspond to an HO-ISB-carbonate-ISB-ester-CHDA-ester-ISB-OH oligomer.

Likewise, the peak observed at 717 Da could correspond to an HO-ISB-carbonate-ISB-carbonate-ISB-OH oligomer. A further peak at 665 Da could correspond to the presence of HO-ISB-ester-CHDA-ester-ISB-ester-CHDA-ester-phenyl and one at 837 Da to this plus a further ISB unit.

Example 9: Inventive; ISB:CHDA 1:0.5; Different Catalyst

The test was essentially carried out as described in example 1, except that a flask fitted with a short-path separator was charged with 17.22 g (0.10 mol) of cyclohexane-1,4-dicarboxylic acid, 29.815 g (0.204 mol) of isosorbide, 64.26 g (0.3 mol) of diphenyl carbonate and 0.0555 g (500 ppm), equivalent to 0.010% by weight, of DBN (1,5-diazabicyclo[4.3.0]non-5-ene).

A light brown polymer with a solution viscosity of eta rel 1.14 was obtained.

The invention claimed is:
1. A method for preparing a polyester carbonate by melt transesterification, comprising the steps of
   (i) reacting at least one cycloaliphatic dicarboxylic acid with at least one diaryl carbonate using at least one catalyst and in the presence of at least one aliphatic dihydroxy compound and
   (ii) subjecting the mixture obtained from step (i) of the method to further condensation, at least with removal of the chemical compound eliminated in the condensation,
   wherein the molar ratio of all aliphatic dihydroxy compounds present in step (i) of the method to all cycloaliphatic dicarboxylic acids present in step (i) of the method prior to reaction in step (i) of the method is 1:0.6 to 1:0.05,
   wherein the at least one cycloaliphatic dicarboxylic acid is selected from a compound of the chemical formula (IIa), (IIb) or mixtures thereof

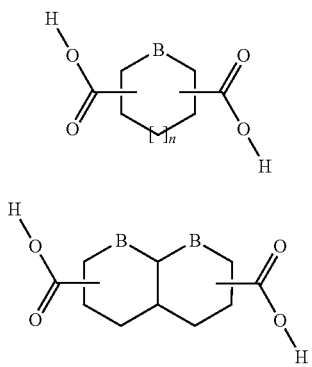

in which

B in each case independently represents a carbon atom or a heteroatom selected from the group consisting of O, S and N and n is a number between 0 and 3.

2. The method according to claim 1, wherein the at least one aliphatic dihydroxy compound is selected from the group consisting of cyclohexane-1,2-diol, cyclohexane-1,3-diol, cyclohexane-1,4-diol, cyclohexane-1,2-dimethanol, cyclohexane-1,3-dimethanol, cyclohexane-1,4-dimethanol, tricyclodecanedimethanol, 3,9-bis(1,1-dimethyl-2-hydroxyethyl)-2,4,8,10-tetraoxaspiro[5.5] undecane, 2,2-bis(4-hydroxycyclohexyl) propane, tetrahydro-2,5-furandimethanol and 1,4:3,6-dianhydrohexitols such as isomannide, isoidide and isosorbide.

3. The method according to claim 2, wherein the at least one aliphatic dihydroxy compound is isosorbide.

4. The method according to claim 1, wherein the at least one cycloaliphatic dicarboxylic acid is selected from the group consisting of cyclohexane-1,4-dicarboxylic acid, cyclohexane-1,3-dicarboxylic acid, cyclohexane-1,2-dicarboxylic acid, tetradihydro-2,5-furandicarboxylic acid, tetradihydro-2,5-dimethylfurandicarboxylic acid, decahydronaphthalene-2,4-dicarboxylic acid, decahydronaphthalene-2,5-dicarboxylic acid, decahydronaphthalene-2,6-dicarboxylic acid and decahydronaphthalene-2,7-dicarboxylic acid.

5. The method according to claim 1, wherein the at least one diaryl carbonate is selected from the group consisting of a compound of the formula (2)

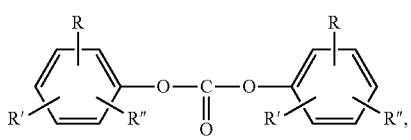

in which

R, R' and R" may each independently be identical or different and represent hydrogen, optionally branched C1-C34 alkyl, C7-C34 alkylaryl, C6-C34 aryl, a nitro group, a carbonyl-containing group, a carboxyl-containing group or a halogen moiety.

6. The method according to claim 5, wherein the at least one diaryl carbonate is diphenyl carbonate.

7. The method according to claim 1, wherein the molar ratio of the sum of all aliphatic dihydroxy compounds present in step (i) of the method and all cycloaliphatic dicarboxylic acids present in step (i) of the method to all diaryl carbonates present in step (i) of the method prior to reaction in step (i) of the method is 1:0.4 to 1:1.6.

8. The method according to claim 1, wherein step (ii) of the method is carried out at temperatures in the range from 210° C. to 280° C.

9. The method according to claim 1, wherein all monomers that are to undergo condensation to the polyester carbonate in step (ii) of the method are already present during step (i) of the method.

10. The method according to claim 1, wherein the chemical compound eliminated in the condensation is removed in step (ii) of the method by means of reduced pressure.

11. The method according to claim 1, wherein the polyester carbonate prepared has a relative solution viscosity eta rel of 1.12 to 1.60.

12. The method according to claim 1, wherein at least one inorganic base and/or at least one organic catalyst is used in step (i) of the method.

13. The method according to claim 12, wherein the at least one inorganic base or the at least one organic catalyst is selected from the group consisting of the hydroxides, carbonates, halides, phenoxides, diphenoxides, fluorides, acetates, phosphates, hydrogen phosphates and borates of lithium, sodium, potassium, caesium, calcium, barium and magnesium, tetramethylammonium hydroxide, tetramethylammonium acetate, tetramethylammonium fluoride, tetramethylammonium tetraphenylborate, tetraphenylphosphonium fluoride, tetraphenylphosphonium tetraphenylborate, dimethyldiphenylammonium hydroxide, tetraethylammonium hydroxide, cetyltrimethylammonium tetraphenylborate, cetyltrimethylammonium phenoxide, diazabicycloundecene (DBU), diazabicyclononene (DBN), 1,5,7-triazabicyclo[4.4.0]dec-5-ene, 7-phenyl-1,5,7-triazabicyclo[4.4.0]dec-5-ene, 7-methyl-1,5,7-triazabicyclo[4.4.0]dec-5-ene, 7,7'-hexylidenedi-1,5,7-triazabicyclo[4.4.0]dec-5-ene, 7,7'-decylidenedi-1,5,7-triazabicyclo[4.4.0]dec-5-ene, 7,7'-dodecylidenedi-1,5,7-triazabicyclo[4.4.0]dec-5-ene, the phosphazene base P1-t-oct (tert-octyliminotris(dimethylamino)phosphorane), the phosphazene base P1-t-butyl (tert-butyl-iminotris(dimethylamino)phosphorane) and 2-tert-butylimino-2-diethylamino-1,3-dimethylperhydro-1,3,2-diaza-2-phosphorane (BEMP).

14. A polyester carbonate obtained by the method according to claim 1.

* * * * *